July 10, 1956    H. J. DORGELYS    2,753,762
OPTICAL MOUNTING STRUCTURE
Filed April 1, 1953    3 Sheets-Sheet 1
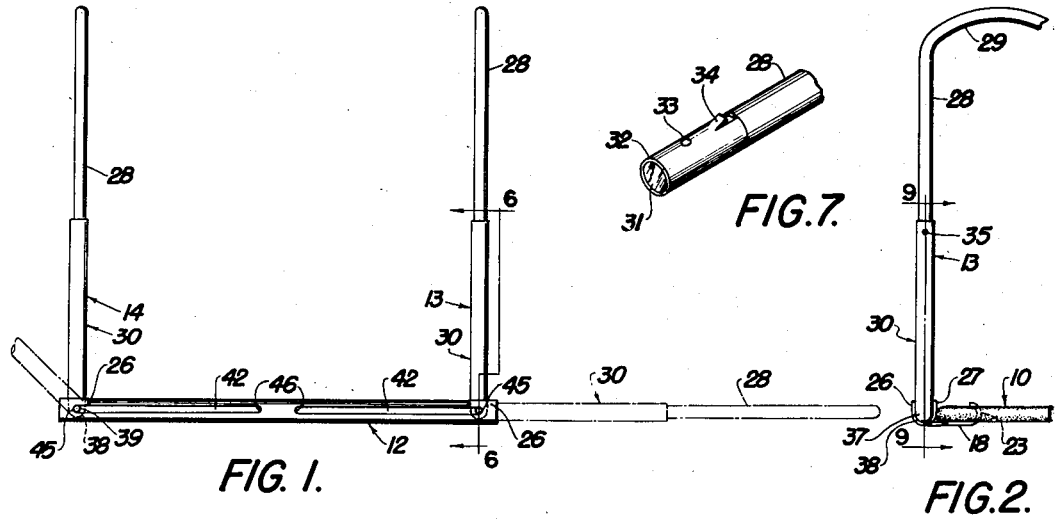
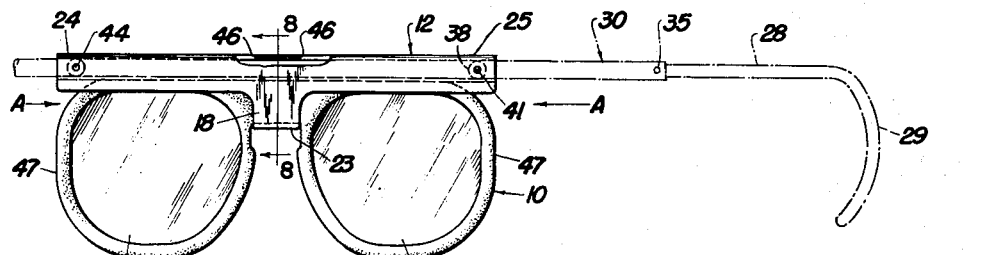
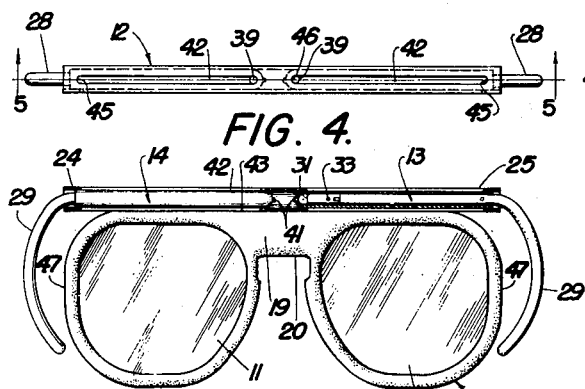
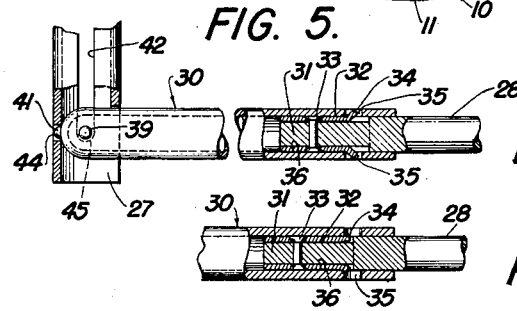
INVENTOR
HENRI J. DORGELYS
BY 
ATTORNEY

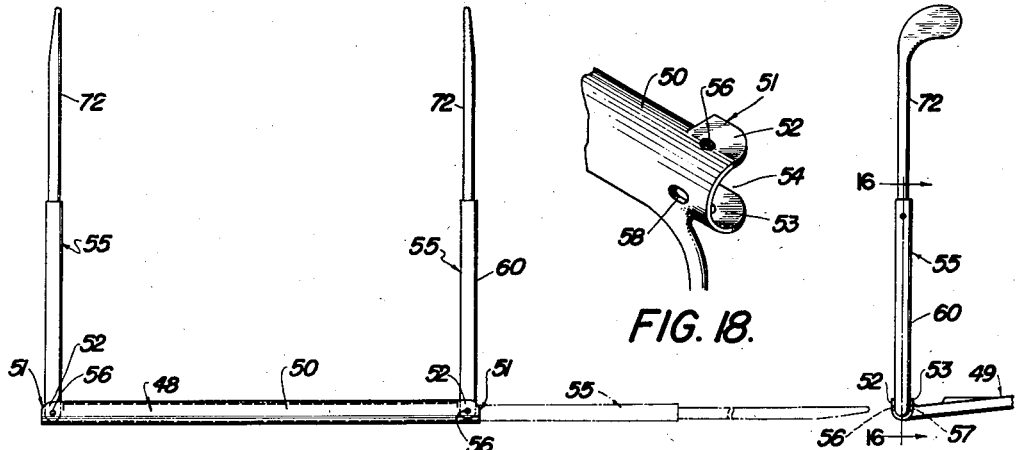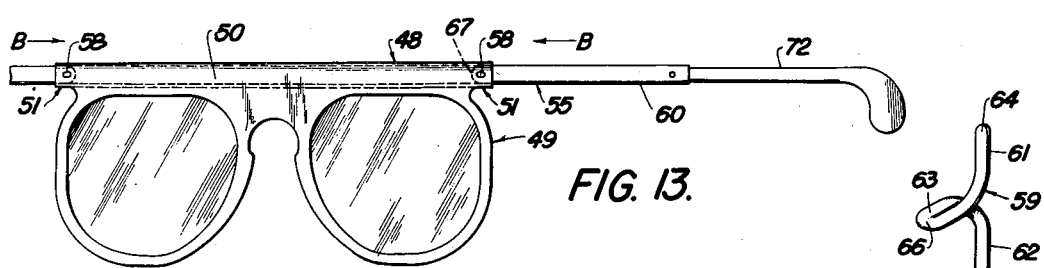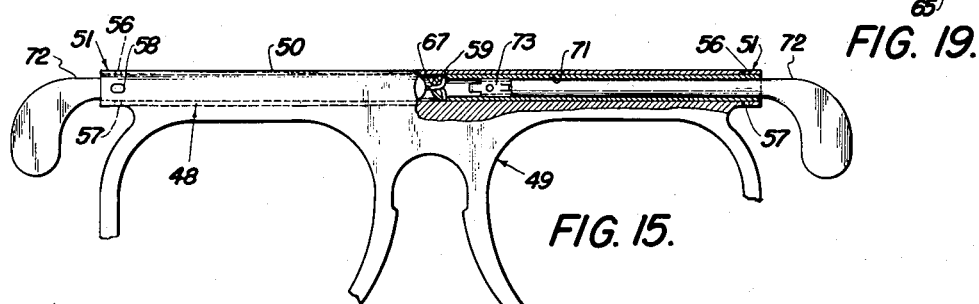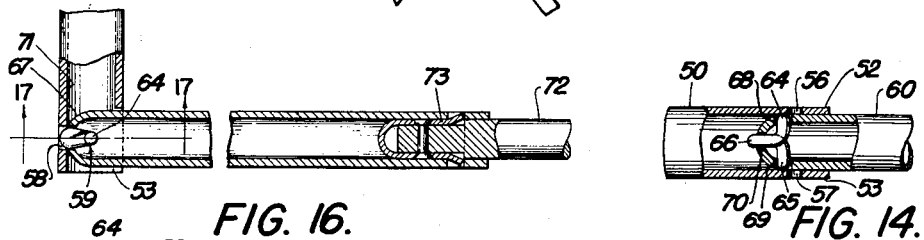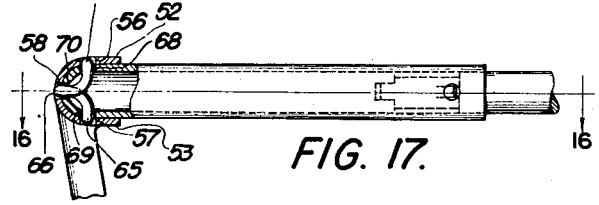

July 10, 1956           H. J. DORGELYS           2,753,762
OPTICAL MOUNTING STRUCTURE
Filed April 1, 1953                         3 Sheets-Sheet 3
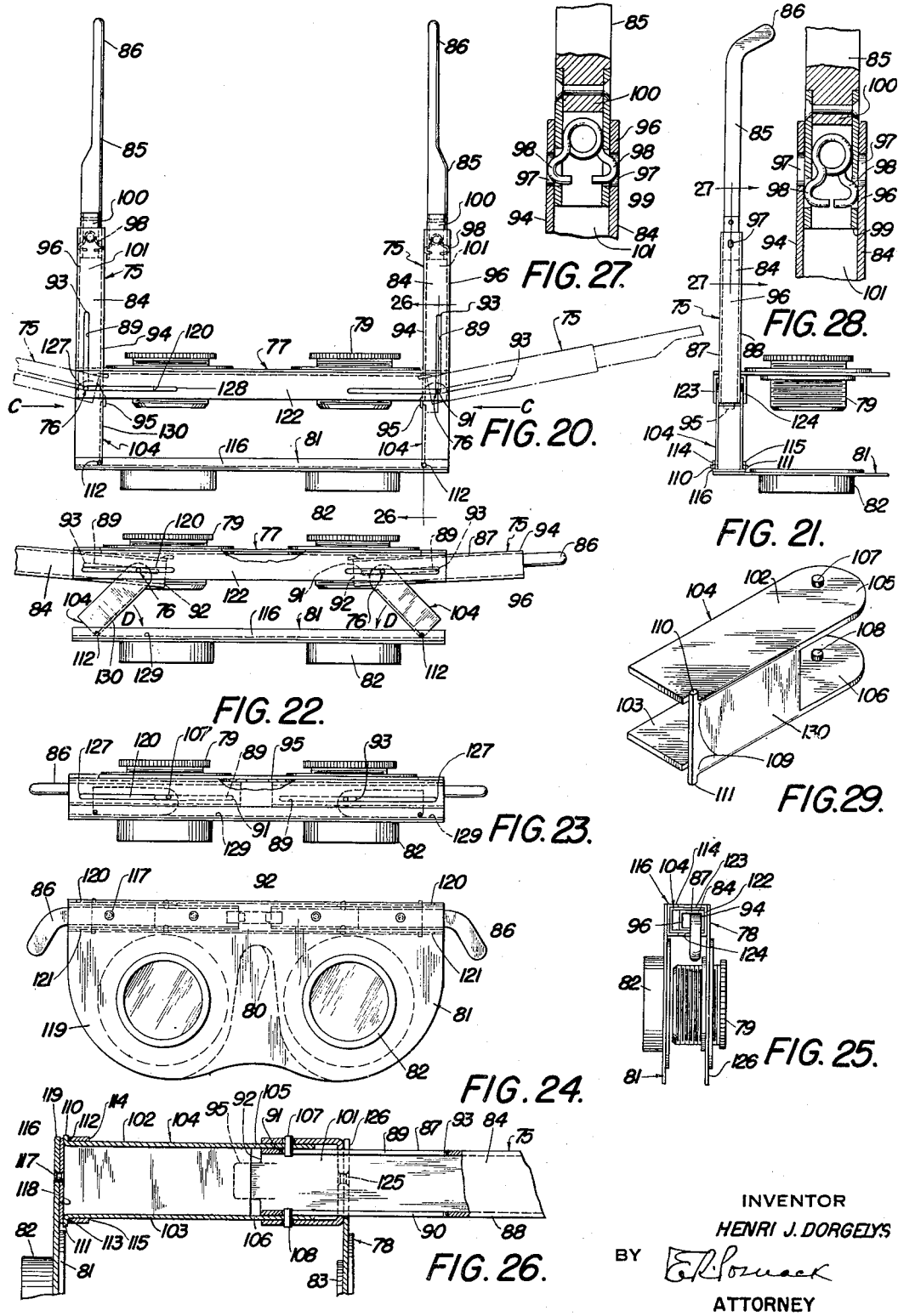
INVENTOR
HENRI J. DORGELYS
BY
ATTORNEY

United States Patent Office 2,753,762
Patented July 10, 1956

2,753,762
OPTICAL MOUNTING STRUCTURE

Henri J. Dorgelys, Hempstead, N. Y., assignor of one-half to Harold Cagen, West Hempstead, N. Y.

Application April 1, 1953, Serial No. 346,215

18 Claims. (Cl. 88—41)

This invention relates to optical mountings, more particularly to a frame and temple construction for eyeglasses and binoculars adapted to be supported upon the bridge of the nose and the ears of the wearer.

It is primarily within the contemplation of this invention to provide an optical mounting having temple members which are adapted to be employed in conventional manner, but which are capable of being retracted within retainer members associated with the frame, so as to constitute a compact device, without loose or dangling parts, and that can conveniently be carried in one's pocket or purse.

In connection with the above-stated aspect of my invention, it is a further object to enable the said temple members to be readily brought to their respective operative and inoperative positions, without requiring any special manipulative skill. And it is within my contemplation to enable the movable temple members to be firmly, yet releasably, secured in their operative and inoperative positions, so that the device may be safely worn, or kept in its retracted condition, without the danger of inadvertent displacement of the temples from their respective operative and inoperative positions.

It is also an object of my invention to provide an optical mounting of the class above-mentioned in which the temple members may be readily removed and interchanged with other temple members, and where they may also be adjustably manipulated to meet the particular requirements of the wearer.

In accordance with the basic concept of my invention, the novel frame and temple construction thereof is adapted for use either as an integral part of an eyeglass structure, as a separate attachment for an eyeglass mounting, or as part of a binocular of compact and conveniently collapsible structure.

It is within my contemplation to provide a relatively simple and readily fabricated optical mounting having the features above-mentioned.

Other objects, features and advantages will appear from the drawings and the description hereinafter given.

Referring to the drawings,

Figure 1 is a plan view of the form of my invention in which the mounting thereof is separately attached to the frame of the eyeglasses, the temple members being shown in their operative position for use on the ears of the wearer, the dot-dash lines indicating a partially retracted position of the temple members.

Figure 2 is a fragmentary side view of the device of Figure 1.

Figure 3 is a front view of the device of Figure 1, with fragments removed for clarity, the temple members being shown by dot-dash lines in their partially retracted position of Figure 1.

Figure 4 is a top view of Figure 3, with the temple members in their fully retracted position.

Figure 5 is a front view of Figure 4, the upper portion being shown sectioned along line 5—5 of Figure 4.

Figure 6 is an enlarged, fragmentary part elevational and part sectional view of Figure 1, along line 6—6 thereof.

Figure 7 is a fragmentary perspective view of the temple bow member showing the locking device thereon.

Figure 8 is a section of Figure 3 taken along line 8—8.

Figure 9 is a part elevational, part sectional view of Figure 2 taken along line 9—9.

Figure 10 is a fragmentary view substantially like Figure 9, but showing the temple bow member just out of its locking engagement with the pivotal temple tube.

Figure 11 is a top view of that form of my invention in which the mounting is integral with the spectacle frame, the dot-dash lines showing the temple members in a partially retracted position.

Figure 12 is a fragmentary side view of Figure 11.

Figure 13 is a fragmentary front view of Figure 11, showing the temple members in a partially retracted position.

Figure 14 is a somewhat enlarged, part sectional, part elevational fragmentary front view of the device of Figure 13, showing the pivotal temple member just out of the locked position within the retainer tube.

Figure 15 is a fragmentary, somewhat enlarged, front view of Figure 13, showing the temple members in their fully retracted position within the retainer tube.

Figure 16 is a part elevational, part sectional view of Figure 12 taken along line 16—16, and along line 16—16 of Figure 17.

Figure 17 is a plan view of Figure 16, with a partial sectional taken substantially along line 17—17.

Figure 18 is an enlarged fragmentary perspective of one of the lateral end portions of the frame and retainer member.

Figure 19 is a perspective view of the spring lock for coactive use with the portion shown in Figure 18.

Figure 20 is a plan view of the binocular form of my invention shown in its operative position for placement upon the ears of the wearer, the dot-dash lines indicating a partially retracted position of the temple members.

Figure 21 is a fragmentary side view of the device of Figure 20.

Figure 22 is a fragmentary plan view of the device of Figure 20 shown in its partially contracted position, parts being removed for clarity.

Figure 23 is a view substantially like that of Figure 22, but showing the device in its fully contracted condition.

Figure 24 is a front view of Figure 23.

Figure 25 is a side view of Figure 24.

Figure 26 is an enlarged fragmentary section of Figure 20 taken substantially along line 26—26 thereof.

Figure 27 is an enlarged fragmentary section of Figure 21 taken substantially along line 27—27 thereof, showing the temple bow spring lock in operative locking position.

Figure 28 is a view substantially like that of Figure 27, but showing the spring lock beyond its locking position.

Figure 29 is a perspective view of one of the pivotal channel links connecting the forward frame and the temple members.

In the various forms of my invention illustrated, there is an optical frame structure, a temple mounting and retainer, and two pivotally mounted temple members, the frame structure supporting said mounting and retainer which in turn pivotally supports the temple members and is adapted to slidably receive them when they are in their fully retracted positions. It is preferred, although not necessary, that each of the temple members have two telescopic elements, to wit, a bow member for fitting over the ear of the wearer, and a pivotal member for slidably receiving therein said bow member. In the preferred form of my invention, the two temple pivotal members of the structure, together with their respective temple bows, are swingable outwardly from their operative positions at right angles to the plane of the frame structure to a position substantially in the plane thereof, whereafter the temple members are retracted inwardly towards each other along paths in or closely adjacent the plane of said frame structure, the temple bows being telescopically retracted within the pivotal members.

In the form of my invention illustrated in Figures 1 to 10, the frame member 10, supporting the lenses 11, also supports the mounting and retainer member 12 for the two temple members 13 and 14, member 12 being detachably secured to the frame. In the specific structure illustrated, the mounting 12 consists of a tubular portion 15 overlying and resting upon the upper edge 16 of the top cross-bar 17 of frame 10, there being a center clip 18 extending downwardly over the nose bridge 19 of the frame and curling along the underside 20 thereof, as clearly illustrated in Figure 8, the upwardly extending lip 21 engaging the rear surface 22 of said nose bridge 19, and the curved base 23 engaging the bottom thereof. The arrangement is hence such that the top cross-bar 17 is flanked at the top and bottom thereof by the said tube 15 and base 23, respectively, whereby the mounting 12 is firmly, yet releasably maintained in place. The lateral sides 24 and 25 of the mounting 12 are open at the rear thereof to accommodate and permit the operative movements of the front terminals of temple members 13 and 14, the tubular portion 15 of the mounting having the lateral edge portions thereof split, cut and bent upwardly and downwardly to form the two parallel supporting walls 26 and 27, respectively. These walls accommodate therebetween the forward terminals of the said temple members, and are in engagement with the upper and lower surfaces thereof, as clearly appears in Figure 6, and as will more specifically hereinafter be described.

Each of said temple members 13 and 14 consists of a rear bow 28 with an ear-engaging portion 29, and a pivotal member 30 adapted slidably to receive therein said bow. In the form illustrated, the rear end 31 of the bow has mounted thereover the cylindrical fitting 32 (see Figs. 6, 7, 9 and 10), the fitting being secured to the bow by rivet 33, the opposite heads of the rivet being countersunk and substantially flush with the outer surface of the fitting. At diametrically opposite portions of fitting 32 are the punched-out spring prongs 34 adapted to enter the correspondingly positioned diametrically opposite apertures 35 of pivotal member 30. The arrangement is hence such that when the forward end of the bow 28 is inserted within the tubular pivotal member 30, the said prongs 34 will first be yieldably depressed when engaging the inner wall 36 of the tube, and as the bow is moved inwardly the prongs 34 will enter the said apertured portions 35, as illustrated in Figure 9, to lock the two telescopic members in place. Should it be desired to remove said bow 28, all that need be done is to force the bow forwardly further into member 30, so that the prongs 34 will be forced inwardly towards each other, as illustrated in Figure 10, whereafter the bow can be rotated approximately 90 degrees, and withdrawn from tube 30, either for repair or replacement purposes. And when it is desired telescopically to contract the temple member, the bow is forced forwardly into pivotal member 30 past the point illustrated in Figure 10, until it reaches the innermost position illustrated in Figure 5.

The forward end 37 of each pivotal member 30 has preferably a semi-spherical surface 38, and contains upwardly and downwardly extending pins or detents 39 and 40, these being in diametrically opposite positions, and also a forwardly extending axially disposed detent 41. The said detents 39, 40 and 41 are proportioned for extending into the correspondingly positioned apertures 42, 43 and 44, respectively, in the lateral sides 24 and 25 of the mounting, the apertures 42 and 43 being elongated pairs of spaced slots at diametrically opposite sides of the mounting 12. In the position of the parts illustrated in Figure 1, the detents 39 and 40 are in engagement with the extreme outer terminals 45 of said slots.

The arrangement is such that the said detents 39 and 40, and the said outer terminals 45 of said slots 42 and 43, constitute pivotal means for the operative rotation of each temple member between the two limiting positions illustrated in Figure 1, that is, between a full line position showing the temple member in position for use, and the dot-dash position substantially in the plane of the frame 10. In the said operative position, each detent 41 is disposed within an aperture 44, whereby the temple members are locked against rotation. However, when the temple members are swung outwardly into their respective forward positions, the detents 41 are disengaged from said apertured portions 44, whereby the temple members are now ready to be forced into their final retracted position. This is done by pushing said temple members inwardly towards each other in the direction of arrows A, the upper and lower detents 39 and 40 being maintained in slidable engagement with the lateral walls defining slots 42 and 43 until they reach the inner terminals 46 of said slots, as illustrated in Figures 4 and 5. In this position, with the bows 28 also telescopically pushed inwardly, the device is in its fully retracted or collapsed position, with the ear portions 29 in adjacent relation to the lens rims 47.

In the final retracted position, the temple members 13 and 14 are held against displacement since they are prevented from movement away from the plane of the frame by the retaining action of the embracing wall of tube 15; and they cannot move outwardly unless a deliberate pull is exerted. Hence, the device is maintained in its inoperative contracted condition without the danger of any parts becoming loose or disengaged. Furthermore, when the temple members are in their respective receptacles, not only are they protected against damage, but they provide a compact structure for the entire device whereby it may conveniently be placed in a pocket or purse. It will also be noted that the compactness of the device is further enhanced by the fact that the ear members 29 are adjacent the frame rim 47 and substantially in the plane thereof.

It is obvious that when it is desired to open the device for use, all that need be done is to grasp the ear members 29 and pull them outwardly, thereby bringing the bows into their outermost positions with the said prongs 34 in locking engagement with the respective apertures 35. Thereafter the pivotal member 30 is swung inwardly to the full line position illustrated in Figure 1, at which position the temple members are prevented from further inward movement by virtue of the engagement of detents 41 with the apertured portions 44.

In the form of my invention illustrated in Figures 11 to 19, the mounting 48 is integral with the frame structure 49, the upper portion 50 of the frame being tubular except for the opposite outer terminal portions 51 each of which consists of an upper wall 52 and a lower parallel wall 53 providing a rear opening 54 for the coacting temple member 55. The said walls 52 and 53 contain apertures 56 and 57, respectively, and the forward portion of each terminal portion 51 contains a horizontally elongated slot 58 preferably in the vertical plane of apertures 56 and 57. The said apertures are adapted to accommodate the adjacent terminals of spring lock 59, there being such a lock in the forward end of each of the pivotal members 60 of the temple members 55.

The said spring lock 59 consists of two oppositely extending arms 61 and 62, said arms being joined at the looped portion 63, the arrangement being such as to form rounded locking terminals 64, 65 and 66 substantially in one vertical plane. A spring lock 59 is positioned at the forward portion 67 within each tubular pivotal member 60, the latter having upper and lower apertures 68 and 69, respectively, and axial aperture 70, adapted to receive therein the said terminal portions 64, 65 and 66, respectively. The spring action of the loop 63 is such as to maintain said terminal portions 64 and 65 in positions extending out beyond the apertured portions 68 and 69, the terminal portion 66 being so disposed as also to extend forwardly beyond the foremost portion of the pivotal member 60.

The arrangement is hence such that when each pivotal member 60, with the spring lock 59 therein, is operatively inserted within a recess 54, the terminals 64 and 65 will snap into apertures 56 and 57 of walls 52 and 53, and the terminal portion 66 will extend into the aperture 58. In this position the member 60 is pivotally mounted, being swingable about terminals 64 and 65 as vertical axis. In view of the rounded configuration of terminal 66 of loop 63, it will readily become disengaged from aperture 58 when the temple member 55 is swung from its operative full line position of Figure 11 to its partially retracted position in the plane of frame 49. From this position, as illustrated in Figure 13, an inward push in the direction of arrow B can be applied to each of the temple members, thereby disengaging the three terminals 64, 65 and 66 from said apertured portions 56, 57 and 58, as illustrated in Figure 14, whereupon a continued inward movement of the pivotal members 60 will cause said terminals 64 and 65 to slidably engage the inner wall 71 of the tubular portion 50 of the retainer 48. This movement is continued until the two opposing temple members 60 come into abutment, as illustrated in Figure 15. In this position the device is in its fully retracted position.

It will be observed that the bow member 72 of each temple member 55 contains a fitting 73 substantially like the fitting 32 above-described, for releasable locking engagement with the tubular pivotal member 60, in the manner above-described.

In the form of my invention illustrated in Figures 20 to 29, a binocular construction is shown embodying, among other elements, the pivotal temple and the mounting-retainer construction constituting the essential features of the other forms of my invention hereinabove described. The temple members 75 are pivotally mounted at the opposite pivotal points 76 in the mounting and retainer member 77, said member 77 being supported by the framework 78 containing the two adjustable eye-pieces 79 and the nose bridge 80 therebetween. Disposed forwardly of the frame 78 is the objective frame 81 supporting the lenses 82 which are in registry with lenses 83 of said eye-pieces 79. The temple members 75 each comprises a pivotal member 84 and telescopically disposed therein a temple bow 85, the latter having an ear portion 86.

The arrangement is hence such that when the device is in its operative position illustrated in Figure 20, it is adapted for placement upon the ears and nose of the wearer, substantially in the manner of conventional eye-glasses, whereby this device may serve a binocular function upon a proper adjustment of the eye-pieces 79. As will more clearly hereinafter appear, this device may also be brought to a compact collapsed condition by an operative pivotal manipulation of the temple members 75, the arrangement being such that not only will the temple members be capable of being brought to a retracted position in association with the mounting 77, but at the same time the rear frame 78 will be brought into close proximity to the forward frame 81, to provide a compact and securely closed device, as illustrated in Figure 23.

Each of the said pivotal members 84 is, in the preferred form illustrated, a hollow member of substantially square or rectangular cross-section, the upper and lower walls 87 and 88 thereof containing the correspondingly positioned parallel elongated slots 89 and 90, respectively, said slots each having front terminals 91 adjacent the forward end 92 of the pivotal member 84, the rear terminals 93 of the said slots being disposed intermediate the forward and rear ends of said member 84. Extending forwardly from the front edge of the inner lateral side 94 of each of said members 87 is the lip 95. The said lateral side 94 and the opposite lateral side 96 each contains adjacent the rear thereof a slightly elongated apertured portion 97 adapted to receive therein the opposite spring detents 98 operatively supported within the thimble 99 disposed over the forward part 100 of the bow 85, as shown in Figure 27. Said detents are in retractable engagement with said apertured portions 97, in well known manner, so as to enable the bows 85 to be telescopically moved longitudinally within the central cavity 101 of pivotal member 84.

The forward portion of each of said pivotal members 84 is disposed between the respective upper and lower walls 102 and 103 of the pivotally mounted channel member or link 104 at each lateral side of the device. The said link 104 contains the two upper and lower parallel rear extensions 105 and 106 of said walls 102 and 103, respectively, said extensions containing pins 107 and 108, respectively, both protruding above and below the planes of the extensions, as clearly indicated in Figure 26, said pins being in vertical registry. At the forward inner corner portion 109 of each of said channel links 104 are pivotal means consisting of the upper pin 110 extending upwardly from the said upper wall 102, and lower pin 111 extending downwardly from the said lower wall 103. The said pins 110 and 111 extend upwardly and downwardly through apertures 112 and 113, respectively, in the respective upper and lower walls 114 and 115 of the transverse channel member 116 secured by rivets 117 to the rear surface 118 of the plate 119 constituting part of the front frame 81.

The inner portions of said rear pins 107 and 108 of said channel links 104 extend downwardly and upwardly, respectively, into the said slotted portions 89 and 90 of each pivotal member 84. The outer portions of said rear pins 107 and 108 extend upwardly and downwardly, respectively, into the opposite slotted portions 120 and 121 of the channel member 122 constituting part of the said mounting 77, channel member 122 having terminal extensions 123 and 124, at opposite ends thereof, in flanking engagement with the respective upper and lower walls 102 and 103 of pivotal channel link 104. Channel 122 is attached by rivets 125 to the plate 126, constituting part of the rear frame 78.

The arrangement is such that when the pivotal channel links 104 are operatively actuated inwardly towards each other, the said outwardly extending portions of pins 107 and 108 slidably move within the respective slotted portions 120 and 121 of channel 122, from the outer terminals 127 of said slots to the inner terminals 128 thereof, thereby enabling the frame 78 to be operatively brought into proximity with forward frame 81 when the temple members are operatively retracted, as will be hereinafter set forth.

When it is desired to bring the device into its collapsed and contracted position, the temple members 75 are swung outwardly to the positions indicated in Figure 20, until they are in substantial longitudinal alignment with the extent of mounting 77. The pivotal movement is effectuated by virtue of the fact that the pins 107 and 108 are in vertical registry, said pins constituting the axis of rotation while the pins are in engagement with the said forward terminals 91 of slotted portions 89 and 90 of pivotal member 84 and with the said outer terminals 127 of the slots 120 and 121 of said channel member 122.

Thereafter said pivotal members 75 are forced inwardly towards each other, whereupon the lateral walls defining slots 89 and 90 of pivotal member 84 will ride along the respective pins 107 and 108 of the pivotal channel link 104, the rear terminals 93 determining the limit of inward movement. As this inward force is continued to be applied against the temple members 75 in the direction of arrows C, the said pivotal links 104 will be rotatably actuated about pins 110 and 111, along arcuate paths indicated by arrows D in Figure 22. During such movement, the said pins 107 and 108 will ride within the slots 120 and 121 of said channel member 122, the innermost terminals 128 of said slots determining the limit of such movement.

The arrangement is hence such that because of the slidable engagement of pins 107 and 108 with said slots 120 and 121, a pivotal movement of links 104 is permitted, whereby the entire frame 78 is caused to move forwardly towards frame 81, inasmuch as the frame assembly 73 is carried by the links 104. When the limit of such movement is reached with links 104 in engagement with the wall 129 of channel 116, the temple members 75 are also in their fully retracted positions, after bows 85 have been pushed inwardly to their fullest extent and said eye-pieces 79 have been retracted as indicated in Figures 23 and 24.

It should be noted that the lips 95 on the inner walls 94 of each of the pivotal members 84 are in engagement with the bases 130 of the pivotal links 104, whereby the said pivotal members 84 are held against further inward movement beyond their longitudinally aligned position with respect to pivotal link 104, as illustrated in Figures 20 and 21.

In the contracted position above-described, the temple members and the frames 78 and 81 are in close juxtaposition, the entire device constituting a compact arrangement adapted for convenient positioning within one's pocket or purse, just as in the case of the spectacles first above-described.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In an optical device, a frame structure for placement along a plane in front of the eyes of the wearer, a mounting thereon, temple members on opposite sides of said structure, and means on said mounting for pivotally and slidably supporting said temple members, said temple members being pivotally movable between an operative rear position substantially normal to the plane of said frame structure and a forward position substantially in the plane of said frame structure, said temple members being slidably movable along said mounting substantially within their said forward plane between respective outer and inner limiting positions, and retainer means adjacent the top portion of said frame member for holding said temple members substantially within the plane of said frame structure and adjacent thereto when they are in said inner positions.

2. In an optical device, a frame structure for placement along a plane in front of the eyes of the wearer, a mounting thereon, temple members having forward pivotal portions and rear ear-engaging portions on opposite sides of said structure, and means on said mounting for pivotally and slidably supporting said temple members, said temple members being pivotally movable between an operative rear position substantially normal to the plane of said frame structure and a forward position substantially in the plane of said frame structure, said temple members being slidably movable along said mounting substantially within their said forward plane between respective outer and inner limiting positions, and retainer means adjacent the top portion of said frame member for holding said temple members substantially within the plane of said frame structure and adjacent thereto when they are in said inner positions, said ear-engaging portions being disposed exteriorly of said mounting and adjacent the lateral edge portions of said frame structure when said temple members are in their said inner limiting positions.

3. In an optical device, a frame structure for placement along a plane in front of the eyes of the wearer, a mounting thereon, temple members on opposite sides of said structure, and means on said mounting for pivotally and slidably supporting said temple members, said temple members being pivotally movable between an operative rear position substantially normal to the plane of said frame structure and a forward position extending along a plane generally in the direction of the plane of said frame structure, said temple members being slidably movable along said mounting substantially within their said forward plane, said mounting having a substantially tubular portion disposed over said frame structure and being proportioned slidably to receive therein said temple members.

4. In an optical device, a frame structure for placement along a plane in front of the eyes of the wearer, a mounting thereon having a substantially tubular portion, upper and lower sections of said tubular portion having laterally opposite spaced slotted portions extending in the general direction of the plane of the frame structure, each of said slotted portions having laterally inner and outer terminal portions, temple members on opposite sides of said structure, upper and lower protuberances at the forward portions of said temple members extending through said slotted portions and proportioned for slidable movement therein, said temple members being pivotally movable between an operative rear position substantially normal to the plane of said frame structure and a forward position extending along a plane generally in the direction of the plane of said frame structure, said temple members being movable along said mounting substantially within their said forward plane between respective outer and inner limiting positions, and retainer means in engagement with said temple members when they are in said inner positions, said terminal portions of said slotted portions defining said respective limiting positions, said tubular portion being proportioned slidably to receive therein said temple members.

5. In an optical device, a frame structure for placement along a plane in front of the eyes of the wearer, a mounting thereon having a substantially tubular portion, the lateral end sections of the mounting being open at the rear thereof and flanked at the top and bottom by rearwardly extending walls, the forward part of said end sections each having an apertured wall, upper and lower sections of said tubular portion having laterally opposite spaced slotted portions extending in the general direction of the plane of the frame structure, each of said slotted portions having laterally inner and outer terminal portions, temple members on opposite sides of said structure, the front terminal of each of said temple members and upper and lower sections thereof having protuberances extending through said apertured wall and through said slotted portions, respectively, said protuberances at the front terminals of said temple members being proportioned for detachable engagement with the corresponding apertured walls, the said upper and lower protuberances being proportioned for slidable movement within said upper and lower slotted portions, said temple members being pivotally movable between an operative rear position substantially normal to the plane of said frame structure and a forward position extending along a plane generally in the direction of the plane of said frame structure, said temple members being movable along said mounting substantially within their said forward plane between respective outer and inner limiting positions.

6. In an optical device, the combination according to claim 5, said protuberances comprising elements yieldably disposed on said temple members.

7. In an optical device, the combination according to claim 5, said temple members being hollow substantially along their longitudinal extent, each of said temple members containing therein at the forward portion thereof a spring wire comprising two oppositely disposed arms extending upwardly and downwardly and joined at a forwardly extending looped portion, said temple members each having upper, lower and front holes therein through which extend said arms and said looped portion, respectively, the extending portions of said arms and looped portions constituting said protuberances.

8. In an optical device, a frame structure for placement along a plane in front of the eyes of the wearer, a mounting detachably secured to said frame structure, temple members on opposite sides of said structure, and means on said mounting for pivotally and slidably supporting said temple members, said temple members being pivotally movable between an operative rear position substantially normal to the plane of said frame structure and a forward position extending along a plane generally in the direction of the plane of said frame structure, said temple members being slidably movable along said mounting substantially within their said forward plane between respective outer and inner limiting positions, and retainer means in engagement with said temple members when they are in said inner positions.

9. In an optical device, a frame structure for placement along a plane in front of the eyes of the wearer, said structure having a centrally disposed nose bridge portion, a mounting at the top of said structure and having a downwardly extending clip in releasable engagement with said nose bridge portion, temple members on opposite sides of said structure, and means on said mounting for pivotally and slidably supporting said temple members, said temple members being pivotally movable between an operative rear position substantially normal to the plane of said frame structure and a forward position extending along a plane generally in the direction of the plane of said frame structure, said temple members being slidably movable along said mounting substantially within their said forward plane between respective outer and inner limiting positions, and retainer means in engagement with said temple members when they are in said inner positions.

10. In an optical device, a frame structure for placement along a plane in front of the eyes of the wearer, said structure having a centrally disposed nose bridge portion, a tubular mounting resting upon the upper portion of said structure and having a downwardly extending clip in releasable engagement with said nose bridge portion, temple members on opposite sides of said structure, and means on said mounting for pivotally and slidably supporting said temple members, said temple members being pivotally movable between an operative rear position substantially normal to the plane of said frame structure and a forward position extending along a plane generally in the direction of the plane of said frame structure, said temple members being slidably movable along said mounting substantially within their said forward plane between respective outer and inner limiting positions, and retainer means in engagement with said temple members when they are in said inner positions, said tubular mounting being proportioned to slidably accommodate therein said temple members.

11. In an optical device, a frame structure for placement along a plane in front of the eyes of the wearer, a mounting thereon, temple members on opposite sides of said structure, and means on said mounting for pivotally and slidably supporting said temple members, said temple members being pivotally movable between an operative rear position substantially normal to the plane of said frame structure and a forward position extending along a plane generally in the direction of the plane of said frame structure, said temple members being slidably movable along said mounting substantially within their said forward plane between respective outer and inner limiting positions, and retainer means in engagement with said temple members for holding them within the plane of said frame structure and adjacent thereto, each of said temple members comprising a front hollow pivotal member and a rear temple bow telescopically fitting into said pivotal member, each pivotal member being pivotally and slidably supported on said mounting, said temple bows each being proportioned to extend to a point short of the pivotal mounting of its pivotal member when telescopically disposed therein.

12. In an optical device, a frame structure for placement along a plane in front of the eyes of the wearer, a tubular mounting disposed at the top of said structure and being integral therewith, temple members on opposite sides of said structure, and means on said mounting for pivotally and slidably supporting said temple members, said temple members being pivotally movable between an operative rear position substantially normal to the plane of said frame structure and a forward position extending along a plane generally in the direction of the plane of said frame structure, said temple members being slidably movable along said mounting substantially within their said forward plane between respective outer and inner limiting positions, and retainer means in engagement with said temple members when they are in said inner positions, the front portion of each of said temple members having a plurality of yieldably supported protuberances, said tubular mounting being proportioned for receiving therein said temple members and for slidable engagement with said protuberances.

13. In a binocular device, a front frame member with two spaced lenses, a rear frame member with two spaced eye-pieces in operative registry with said lenses, said members being in parallel relation and extending in planes whereby they are adapted for placement in front of the eyes of the wearer, two links disposed on opposite sides of said device, each link being pivotally connected to the lateral edge portions of corresponding sides of said members, two opposite temple members each pivotally and slidably attached to one of said links, a mounting on one of said frame members provided with means for pivotally and slidably supporting said links and said temple members, said temple members being pivotally movable between an operative rear position and a forward position extending along a plane substantially parallel to the planes of said frame structures, said temple members being slidably movable along said mounting substantially within their said forward plane.

14. In an optical device, the combination according to claim 13, said temple members being movable within said front plane between respective outer and inner limiting positions, and retainer means in engagement with said temple members when they are in said inner positions.

15. In a binocular device, a front frame member with two spaced lenses, a rear frame member with two spaced eye-pieces in operative registry with said lenses, said members being in parallel relation and extending in planes whereby they are adapted for placement in front of the eyes of the wearer, two links disposed on opposite sides of said device, each link being pivotally connected to the lateral edge portions of corresponding sides of said members, one of said frame members being movable between two limiting positions, one of said positions being with said members in spaced relation, the other of said positions being with said members in contiguous relation, two opposite temple members each pivotally and slidably attached to one of said links, a mounting on one of said frame members provided with means for pivotally and slidably supporting said links and said temple members, said temple members being pivotally movable between an operative rear position and a forward position extending along a plane substantially parallel to the planes of said frame structures, said temple members being slidably movable along said mounting substantially within their said forward plane.

16. In a binocular device, a front frame member with two spaced lenses, a rear frame member with two spaced eye-pieces in operative registry with said lenses, said members being in parallel relation and extending in planes whereby they are adapted for placement in front of the eyes of the wearer, two links disposed on opposite sides of said device, each link being pivotally connected to the lateral edge portions of corresponding sides of said members, the rear one of said frame members being movable between two limiting positions, one of said positions being with said members in spaced relation, the other of said positions being with said members in contiguous relation, two opposite temple members each pivotally and slidably attached to the rear one of said links, a mounting on the rear frame member provided with means for pivotally and slidably supporting said links and said temple members, said temple members being pivotally movable between an operative rear position and a forward position extending along a plane substantially parallel to the planes of said frame structures, said temple members being slidably movable along said mounting substantially within their said forward plane between respective outer and inner limiting positions, and retainer means in engagement with said temple members when they are in said inner positions.

17. In a binocular device, a front frame member with two spaced lenses, a rear frame member with two spaced eye-pieces in operative registry with said lenses, said members being in parallel relation and extending in planes whereby they are adapted for placement in front of the eyes of the wearer, two links disposed on opposite sides of said device, each link being pivotally connected to the lateral edge portions of corresponding sides of said members, the rear one of said frame members being movable between two limiting positions, one of said positions being with said members in spaced relation, the other of said positions with said members in contiguous relation, a mounting on the rear frame member having two laterally opposite spaced elongated slotted portions thereon, two temple members at opposite sides of the said rear frame member, the forward portions of each of said temple members having longitudinal slotted portions therein, the said slotted portions of said mounting and said temple members on corresponding sides of the device being in intersecting relation, each of said links being pivotally mounted on the front frame member and having pin elements on the rear thereof extending through said intersecting slotted portions and being in pivotal and slidable engagement with said slotted portions, said temple members being pivotally movable between an operative rear position and a forward position extending along a plane substantially parallel to the planes of said frame structures, said temple members being slidably movable along said mounting substantially within their said forward plane between respective outer and inner limiting positions, and retainer means in engagement with said temple members when they are in said inner positions.

18. In an optical device, the combination according to claim 17, said mounting having upper and lower walls each having two laterally opposite spaced elongated slotted portions thereon, said temple members having upper and lower walls each having longitudinal slotted portions therein, each of said links having upper and lower walls each carrying a pin element extending thereabove and therebelow, the outer portions of the said upper and lower walls of said mounting flanking the rear portions of the respective upper and lower walls of said links, and the said rear portions of said upper and lower walls of the links flanking the forward portions of the respective upper and lower walls of said temple members.

References Cited in the file of this patent

UNITED STATES PATENTS

| | | |
|---|---|---|
| 574,124 | Wainwright | Dec. 29, 1896 |
| 1,245,884 | Day | Nov. 6, 1917 |
| 2,027,123 | Searles | Jan. 7, 1936 |
| 2,166,110 | Baldanza | July 18, 1939 |

FOREIGN PATENTS

| | | |
|---|---|---|
| 112,128 | Germany | July 24, 1900 |
| 303,730 | Great Britain | Jan. 10, 1929 |